United States Patent
Purohit

(10) Patent No.: US 10,856,202 B2
(45) Date of Patent: Dec. 1, 2020

(54) CREATION OF A WIRELESS MESH NETWORK AMONG PROXIMATELY LOCATED WIRELESS DEVICES

(71) Applicant: GainSpan Corporation, San Jose, CA (US)

(72) Inventor: Sibasis Purohit, Bangalore (IN)

(73) Assignee: GainSpan Corporation, San Jose, CA (US)

( * ) Notice: Subject to any disclaimer, the term of this patent is extended or adjusted under 35 U.S.C. 154(b) by 757 days.

(21) Appl. No.: 14/797,195

(22) Filed: Jul. 13, 2015

(65) Prior Publication Data

US 2017/0019828 A1    Jan. 19, 2017

(51) Int. Cl.
  *H04W 40/02*  (2009.01)
  *H04W 24/06*  (2009.01)
  *H04W 40/20*  (2009.01)

(52) U.S. Cl.
  CPC .......... *H04W 40/02* (2013.01); *H04W 24/06* (2013.01); *H04W 40/20* (2013.01)

(58) Field of Classification Search
  CPC ........ H04W 40/02; H04W 4/02; H04W 24/06
  See application file for complete search history.

(56) References Cited

U.S. PATENT DOCUMENTS

| | | | |
|---|---|---|---|
| 7,583,587 B2 | 9/2009 | Qiu et al. | |
| 8,743,705 B2 | 6/2014 | Holman et al. | |
| 8,837,360 B1 * | 9/2014 | Mishra | H04L 41/12 370/328 |
| 2009/0059814 A1 | 3/2009 | Nixon et al. | |
| 2013/0188508 A1 * | 7/2013 | Cho | H04L 67/18 370/252 |
| 2013/0188626 A1 * | 7/2013 | Lakhzouri | H04W 64/003 370/338 |
| 2013/0250931 A1 * | 9/2013 | Abraham | H04W 8/005 370/338 |
| 2014/0056248 A1 * | 2/2014 | Wang | H04W 76/023 370/329 |
| 2015/0172222 A1 * | 6/2015 | Liao | H04L 49/356 370/392 |

OTHER PUBLICATIONS

Vinicius Bohrer, Ramon Fernandes, Thais Webber, César Marcon, "WiNeS—A Flexible Framework for Wireless Network Description and Simulation", date Dec. 2012, pp. 1 to 27.

(Continued)

*Primary Examiner* — Xavier S Wong
(74) *Attorney, Agent, or Firm* — Pearl Cohen Zedek Latzer Baratz LLP

(57) ABSTRACT

A wireless device receives a packet from a sender node according to a routing protocol and determines a position information of the sender node. The wireless device calculates a distance to the sender node from the wireless device and discards the packet if the distance is outside of a range. Otherwise, the packet is processed according to the routing protocol. As a result, the approach may be suited to testing type environments where the wireless devices are proximately placed and yet one may wish to simulate real-world distances between the wireless devices.

17 Claims, 5 Drawing Sheets

(56) References Cited

OTHER PUBLICATIONS

Thomas Staub, Reto Gantenbein, Torsten Braun, "VirtualMesh: an emulation framework for wireless mesh and ad hoc networks in OMNeT++", date 2010, pp. 1-16, vol. 87 No. 1-2 66-81.

Reto Gantenbein, "Virtualmesh: an emulation framework for wireless mesh networks in OMNeT++", date 2010, pp. 1-120, vol. 87 No. 1-2 66-81.

Tinku Rasheed, "Wireless Mesh Network Simulation Framework for OMNeT++", date 2007, pp. 1-23.

Vivek Mhatre, "Enhanced Wireless Mesh Networking for ns-2 simulator", ACM SIGCOMM Computer Communication Review, date Jul. 2007, pp. 69-72, vol. 37 Issue 3, publisher: ACM New York, NY, USA.

"Wireless Mesh Network Test Bed", http://www.quintechelectronics.com/website/HTML/Wireless-Mesh-Test-Bed.html, pp. 1-3.

Heecheol Song, Bong Chan Kim, Jae Young Lee, Hwang Soo Lee, "IEEE 802.11-based Wireless Mesh Network Testbed", Print ISBN: 963-8111-66-6, Date of Conference: Jul. 1-5, 2007, pp. 1-5, Publisher:IEEE.

\* cited by examiner

CREATION OF A WIRELESS MESH NETWORK AMONG PROXIMATELY LOCATED WIRELESS DEVICES

BACKGROUND

Technical Field

The present disclosure relates to wireless networks, and more specifically to creation of a wireless mesh network among proximately located wireless devices.

Related Art

A wireless network generally includes two or more wireless stations capable of communicating with each other on a wireless medium. The wireless network may include switches in the communication path between wireless stations for providing switching function between the wireless stations.

Thus, a switch may receive a packet from one of the wireless stations or other switches, and forward the packet in the direction of the destination wireless station. The packet is eventually delivered to the destination wireless station. The wireless stations and switches may be together referred to as wireless devices.

Networks are often provided as mesh networks, implying the possibility of connectivity by more than one path from or to at least some of the wireless stations, with each path being defined by a sequence of wireless devices. In wireless networks, such possibility exists typically in view of a wireless device being in the wireless transmission range of more than one wireless device.

The mesh structure ensures that packets are delivered in an optimal path to the wireless stations, with minimal or no possibility of loops in the delivery of packets. For example, Routing Protocol for Low Power and Lossy Networks (RPL) imposes a hierarchical structure with one of the switches as the root and the wireless stations as end devices. Upon one of the switches becoming unavailable, the RPL protocol re-defines the hierarchy based on the connectivity available among other available switches.

It may be appreciated that mesh networks are commonly formed among wireless devices which are spatially distributed such that each wireless device is in the communication range with only a few other wireless devices.

However, there is often a need to create such wireless mesh networks among proximately located wireless devices. Proximately here implies that the wireless devices are close spatially such that each wireless device is in communication range of potentially many of the wireless devices of the network. For example, a vendor may wish to test many of the wireless devices, and the devices under test may be placed in a small location such as a test bed in a laboratory setting.

Several aspects of the present disclosure are directed to creation of a wireless mesh network among proximately located wireless devices.

BRIEF DESCRIPTION OF THE VIEWS OF DRAWINGS

Example embodiments of the present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A wireless device provided according to an aspect of the present disclosure receives a packet from a sender node according to a routing protocol and determines a position information of the sender node. The wireless device calculates a distance to the sender node from the wireless device based on the position information, and discards the packet if the distance is outside of a range. Otherwise, the packet is processed according to the routing protocol.

As a result, the approach may be suited, for example, to testing type environments where the wireless devices are proximately placed and yet one may wish to simulate real-world distances between the wireless devices.

In an embodiment, the position information is encoded in the form of Cartesian coordinates (representing the hypothetical position of the wireless device) within the corresponding MAC addresses of the wireless devices. Accordingly the distance between a pair of wireless devices is computed to equal the spatial distance between the points represented by the respective Cartesian coordinates.

Several aspects of the invention are described below with reference to examples for illustration. It should be understood that numerous specific details, relationships, and methods are set forth to provide a full understanding of the invention. One skilled in the relevant arts, however, will readily recognize that the invention can be practiced without one or more of the specific details, or with other methods, etc. In other instances, well-known structures or operations are not shown in detail to avoid obscuring the features of the invention.

2. Mesh Network

Figure 1:
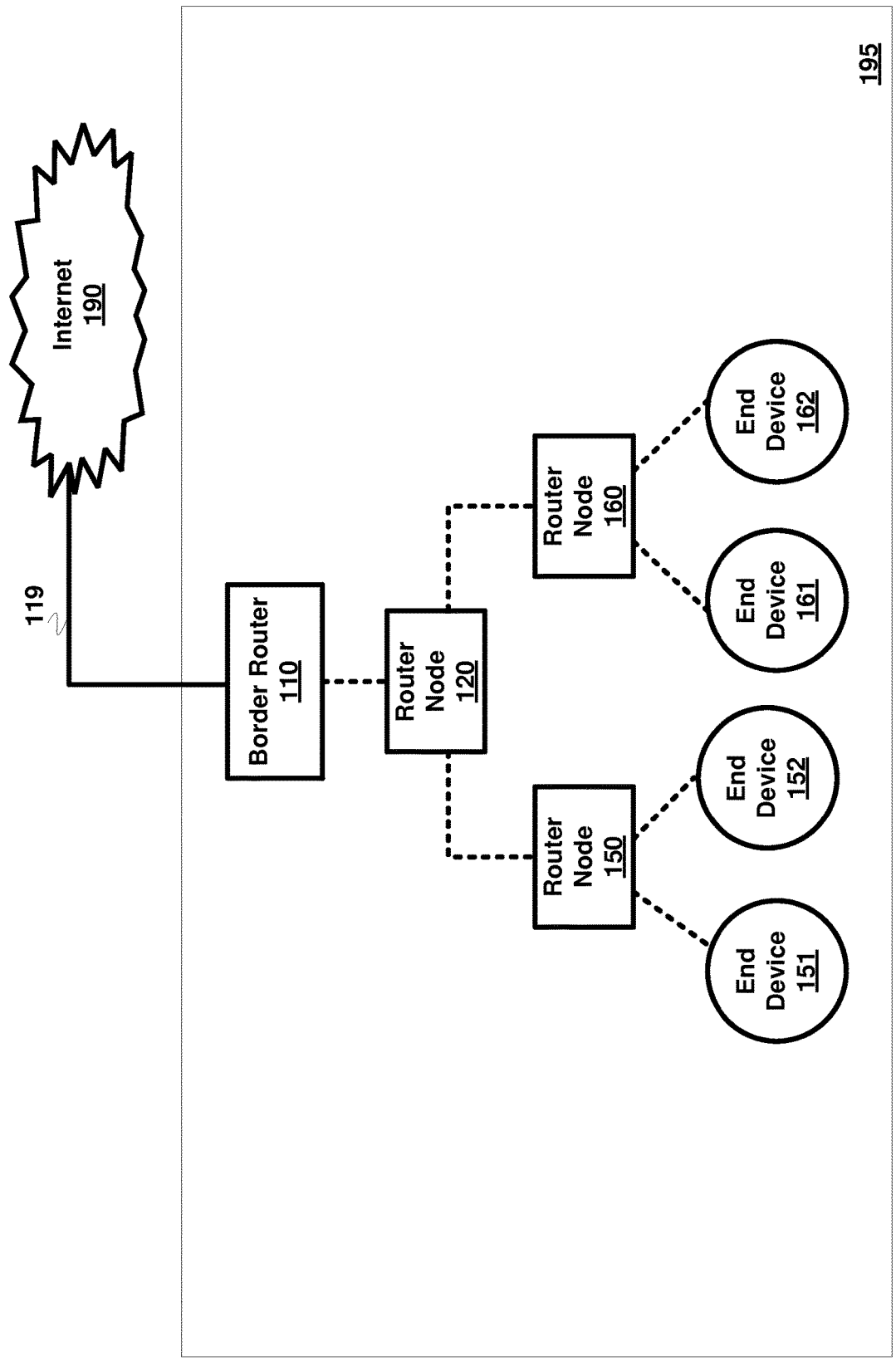
FIG. 1 is a block diagram of an example environment in which several aspects of the present disclosure may be implemented.

FIG. 1 is a block diagram representing the topology of a typical mesh network sought to be created from several proximately located wireless devices, according to several aspects of the present disclosure. The topology in FIG. 1 is shown containing only representative devices and systems for illustration. However, real world topologies may contain more or fewer systems/devices. FIG. 1 is shown containing border router 110, router nodes 120, 150 and 160, end devices 151, 152, 161, and 162, and Internet 190.

Each of the devices/nodes of FIG. 1 shown contained in wireless mesh network 195 represents a wireless device. As may be observed, the wireless devices are shown organized hierarchically based on operation of protocols such as RPL, and each dotted line of FIG. 1 thus represents a direct wireless path between two adjacent devices in the formed hierarchy. The corresponding pair of wireless devices (connected by a dotted line) are within the communication range of each other. In general, a pair of devices within communication range of each other are said to be neighbors. Thus, each pair of adjacent devices in the hierarchy are neighbors, though there can be other neighbors which are not adjacent devices in the hierarchy. Thus, for example, each of end devices 151 and 152 is a neighbor of router 150, and each of routers 150 and 160 is a neighbor of router 120, etc., in the hierarchy.

Internet 190 extends the connectivity of devices in mesh network 195 to various systems (not shown) connected to, or part of, Internet 190. Internet 190 is shown connected to border router 110 through a wired path 119. Internet 190 may be implemented using protocols such as IP. In general, in IP environments, an IP packet is used as a basic unit of transport, with the source address being set to the IP address assigned to the source system from which the packet originates and the destination address set to the IP address of the destination system to which the packet is to be eventually delivered. The IP packet is encapsulated in the payload of layer-2 packets when being transported across WLANs.

An IP packet is said to be directed to a destination system when the destination IP address of the packet is set to the IP address of the destination system, such that the packet is eventually delivered to the destination system. When the packet contains content such as port numbers, which specifies the destination application, the packet may be said to be directed to such application as well. The destination system may be required to keep the corresponding port numbers available/open, and process the packets with the corresponding destination ports.

In an embodiment, each wireless device (also termed a "node") of mesh 195 is a wireless station (STA) according to IEEE 802.11 (family of) standards, though alternative embodiments can be implemented using standards such as IEEE 802.15.4, as would be apparent to one skilled in the relevant arts by reading the disclosure herein. An operator/user may configure/designate which one(s) of the STAs are to operate as a border router (110 in FIG. 1), as router nodes (120, 150 and 160), and as end devices (151, 152, 161, and 162). In some embodiments, a router may additionally operate as an end device also.

In an embodiment, mesh 195 is formed according to RFC 6550 entitled, "RPL protocol (IPv6 Routing Protocol for Low-Power and Lossy Networks)", by the Internet Engineering Task Force (IETF). In alternative embodiments, however, mesh 195 may be formed using other approaches. In general a neighbor relationship may exist between any number of wireless nodes with other wireless nodes, though RPL is shown operating to create a hierarchy, with border router 110 representing the root of the hierarchy, and end devices representing corresponding leaf nodes of the hierarchy.

Thus, border router 110, as well as each of the router nodes of FIG. 1, store routing information (e.g., in the form of routing tables) to enable routing of unicast packets by forwarding the unicast packets to a corresponding next-hop node in mesh 195, as is well known in the relevant arts. In the case of a broadcast, all nodes in mesh 195 receive a broadcast packet, where the broadcast packet is further processed.

In real world scenarios, wireless devices may be positioning spatially apart from each other, such that the resultant topology matches the topology shown in FIG. 1. In test environments, however, a user needs to create the wireless mesh network using multiple devices, which are proximately located to each other (e.g., on a laboratory test beds). The limited physical space made available in such test environments doesn't provide the user with sufficient spatial distance needed to create the intended topology. Rather, RPL type protocols may control the specific hierarchical topology formed since many (if not all) wireless devices are within the communication range of many wireless devices.

Aspects of the present disclosure relate to creation of a wireless mesh network among proximately located wireless devices, as described below with examples.

3. Creation of a Wireless Mesh Network

Figure 2:
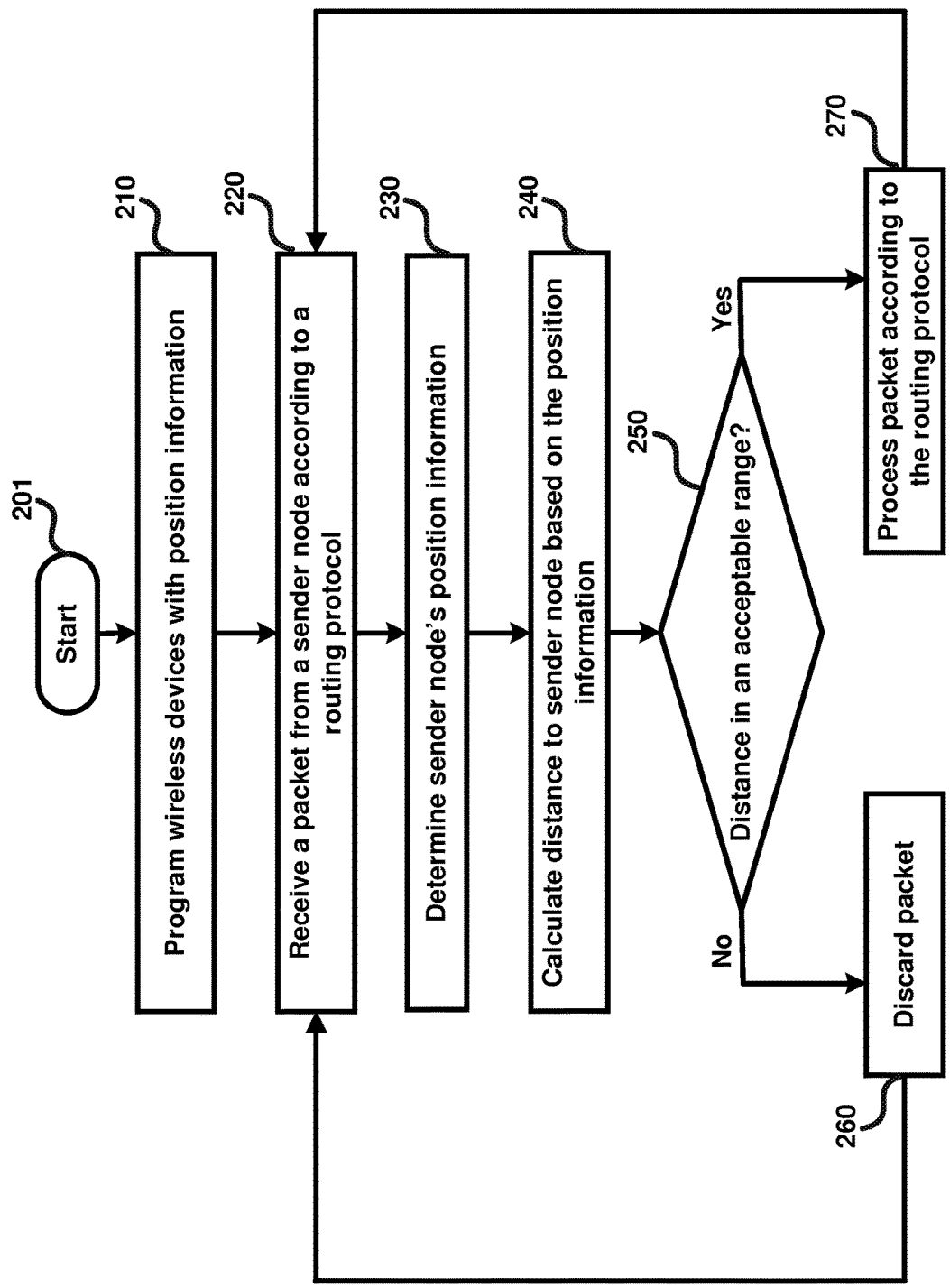
FIG. 2 is a flow chart illustrating the manner in which a wireless mesh network is created among proximately located wireless devices, in an embodiment of the present disclosure.

FIG. 2 is a flow chart illustrating the manner in which a wireless mesh network is created among proximately located wireless devices, in an embodiment of the present disclosure. Merely for illustration, the flowchart is described below as being performed with respect to router node 150 for illustration. However, the features can be implemented in the other nodes (including end devices, border routers, router nodes, etc.) of FIG. 1 also, as well as in other environments and topologies, without departing from the scope and spirit of various aspects of the present invention, as will be apparent to one skilled in the relevant arts by reading the disclosure provided herein.

In addition, some of the steps may be performed in a different sequence than that depicted below, as suited to the specific topology, as will be apparent to one skilled in the relevant arts. Many of such implementations are contemplated to be covered by several aspects of the present disclosure. The flow chart begins in step 201, in which control immediately passes to step 210.

In step 210, nodes (including router node 150) of mesh 195 are programmed with position information. As a result of such programming, router node 150 maintains the position information for later use in the context of routing protocols, as described below. Position information indicates the relative location of each wireless device in relation to at least some of the other wireless devices. In an embodiment described below, the 'location' of each wireless device is programmed in terms of Cartesian coordinates, even though all the wireless devices would be located physically in proximate area, with possibly no correlation to the locations specified by the corresponding Cartesian coordinates.

However, in alternative embodiments, other types of measures can be used for such desired position (in the operation of routing protocol), as will be apparent to a skilled practitioners by reading the disclosure provided herein. For example, position information may include a range of levels from the root each corresponding wireless device is desired to be operated in, for the purpose of routing protocol.

In step 220, router node 150 receives a packet from a sender node according to a routing protocol. In the context of RPL, an example of such a packet can be any of DIO, DAO and DIS type packets, which are used for formation of the routing tables in various wireless nodes of FIG. 1.

In step 230, router node 150 determines the position information of sender node. In an embodiment described below, the position information is embedded in the MAC address of the sender and thus present in the layer-2 source address. However, alternative approaches can be employed for determining the position information of sender node, as will be apparent to a skilled practitioner by reading the disclosure herein.

In step 240, router node 150 calculates the distance to the sender node. The calculation generally depends on the manner in which position information is defined. For example, in case of usage of Cartesian coordinates, the distance is computed using Pythagorean Theorem, well known in the relevant arts.

In step 250, router node 150 checks whether the distance is within an acceptable range. In an embodiment, the range is defined as an upper limit. Thus, control passes to step 270 if the distance is below that upper limit and to step 260 otherwise. In step 260, the packet is discarded without further processing.

In step 270, the packet is processed according to the routing protocol, in a known way. For example, any appropriate response packets (either to the sending node, or other neighbor nodes) may be generated and sent, in addition to updating any internal state information. In general, the processing operates to define the routing tables in each of the wireless devices of the wireless network, based on the specification of the routing protocol.

Thus, in accordance with FIG. 2, a designer/developer may control packets of which neighbors are processed and of which neighbors are discarded, by appropriate design of position information. In other words, by using the distance information to discard packets as a threshold matter in formation of routing tables, administrators can simulate real world distance scenarios even though the wireless devices are proximately located with respect to each other.

Such a feature may be particularly useful in the test environments noted above, since potentially every wireless device can be within the communication range of all other wireless devices, and the designer can control which packets are disregarded by each wireless device by appropriate programming of the position information for each wireless device.

The features described above can be implemented in various ways, as will be apparent to a skilled practitioner based on the disclosure provided herein. The description is continued with respect to some example embodiments.

4. Communication Layers

Figure 3:
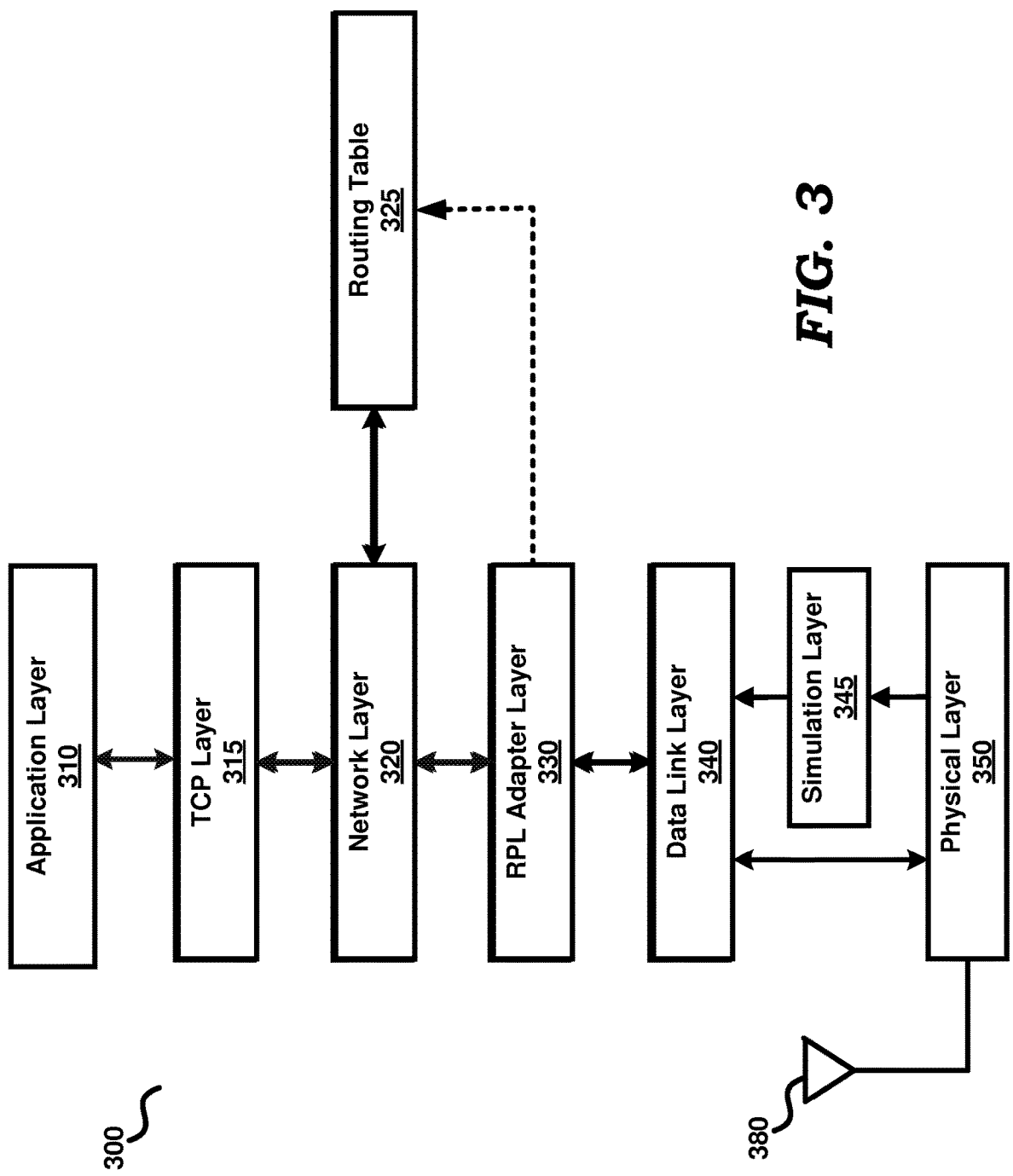
FIG. 3 is a block diagram showing the various communication layers in a wireless device of wireless mesh network, in an embodiment.

FIG. 3 is a block diagram showing the various communication layers (protocol stack) in a node of wireless mesh network 195. Merely for illustration, it is assumed that the blocks of FIG. 3 are contained in router node 150. However, the other devices of wireless mesh network 195 may have similar or identical protocol stacks.

Application layer 310, TCP layer 315, network layer 320, data link layer 340, and physical layer 350 of FIG. 3 may be implemented to generally conform to protocols/models such as those based on the ISO/OSI (International Standards Organization/Open Systems Interconnect) model and TCP/IP, and are only briefly described below, since the corresponding implementations of the blocks would be well known to one skilled in the relevant arts by reading the disclosure herein. Further, only the relevant blocks of the protocol stack are shown in FIG. 3, and typically more blocks (such as transport layer etc.) according to the ISO/OSI model may be present, as also would be apparent to one skilled in the relevant arts.

Physical layer 350 represents the electrical and physical interface between node 150 and a transmission medium (here a wireless medium). In case of outgoing data, physical layer 350 receives data from data link layer 340 and forwards the data to antenna 380 for transmission. In case of incoming data, physical layer 350 receives data (e.g., in the form of a packet) from antenna 380 and forwards the data to simulation layer 345.

Simulation layer 345 determines whether to discard or further process each received packet, in accordance with the loop(s) shown in FIG. 2. Thus, simulation layer 345 accepts incoming packets from physical layer 350, determines the position information of the sender node (from which the packet is received), and calculates the distance to the sender node based on the position of the sender node in relation to the position of node 150. If the distance calculated is outside of a pre-determined range, simulation layer 345 discards the packet. If, however, the distance calculated is within the pre-determined range, the packet is forwarded to the data link layer 340.

In an embodiment, simulation layer 345 may be configured to inject an error into the received packets. For example, if an administrator determines (as part of a test environment) that an error rate of 1% must be simulated within the mesh network, then for every 100 packets that are received by the simulation layer of a device, 1 packet is injected with an error. Injecting an error may refer to the simulation layer over-writing any part of the received packet. For example, 1-2 bytes in the IP header or the TCP/UDP header may be over-written with random values. The object of injecting the error is so that layers higher than the simulation layer 345 reject the packet due to the error. For instance, if the IP header is changed as a result of injecting the error, the IP-layer would reject the packet (e.g., due to the checksum failing). As another example, if the TCP header is changed as a result of injecting the error, the TCP-layer (or potentially the lower layers as well) would reject the packet. The administrator would be able to measure the error rate using any number of known techniques. For example, in case of an error in the TCP header, the administrator may measure the error rate by monitoring the acknowledgements or by monitoring the retransmission of packets (triggered due to the error).

According to another aspect, simulation layer 345 may be configured to modify the received signal strength indication (RSSI) value of an incoming packet. While creating the hierarchy of a mesh network, nodes are typically configured such that a parent node among a potential pool of parent nodes is selected based on the higher signal strength of the selected parent node in comparison to the other potential nodes. However, in the test environments noted above, since all wireless devices are potentially in a proximal range, the corresponding signal strengths (i.e., RSSI values) of the potential pool of parent nodes are likely to be similar as well. Therefore, it is desirable to change the RSSI value of the incoming packets based on (e.g., proportionate to) the simulated distances such that devices in closer proximity of the receiving node are assigned higher RSSI values and devices that are configured to be with relatively larger distances from the receiving node are assigned lower RSSI values.

As is well known in the relevant arts, physical layer 350 generates a corresponding signal strength (i.e., RSSI) value for each received packet. During the course of normal operations, the RSSI value is utilized by the RPL adapter layer 330 in selecting a parent node. According to aspects of the present disclosure, simulation layer 345 overrides (replaces) the RSSI values provided by the physical layer with newly computed values which are dependent on the calculated distance to the sender node. For example, for packets received from two potential parent nodes within the acceptable pre-determined range of distances, simulation layer 345 may assign lower RSSI values for packets received from nodes configured at higher distances. This simulation layer 345 then passes such assigned values to the data link layer 340, which then passes it to the RPL adapter layer 330. Therefore, when the RPL adapter layer 330 subsequently processes the received packets (e.g., DIO packets) to assign a parent node, the node with the higher RSSI value (i.e., configured to be at shorter distance) may be chosen as a parent.

Even though simulation layer 345 is shown between layers 340 and 350, it should be appreciated that simulation layer 345 may be placed in other contexts, for example, as a part of data link layer, between layers 330 and 340, or as a part of layer 330 itself. In the configuration of FIG. 3, simulation layer 345 operates to discard every packet (including broadcasts, unicasts, routing protocol related or otherwise) received from devices configured with distance outside of the pre-determined range.

Data link layer 340, operates to provide a reliable data link between node 150 and other nodes in mesh network 195, and may perform medium access control (MAC), logical link control (LLC), as well as error checking operations. In case of outgoing data packet, data link layer 340 receives data from RPL adapter layer 330 and forwards the data packet to physical layer 350 for transmission (via antenna 380). In case of incoming data packet, physical layer 350 receives data (e.g., sent from a sender node whose distance from node 150 is determined to be within a pre-determined range) from simulation layer 345 and forwards the data packet to RPL adapter layer 330.

RPL adapter layer 330 performs operations needed to enable node 150 to become part of wireless mesh network 195 by participating in forming routing information in routing nodes of wireless mesh network 195, as known in the relevant arts. Thus, RPL adapter layer 330 may form DIS/DIO messages, which are then forwarded via data link layer 340 and physical layer 350 for transmission via antenna 380. Specifically, DIS messages are used to solicit DIO messages from other nodes, and DIO messages are used to advertise presence of node 150 to other nodes, where the other nodes are all in the communication range (i.e., listening vicinity) of node 150.

RPL adapter layer 330 may receive DAO messages from other router nodes and/or end devices (via antenna 380, physical layer 350, simulation layer 345 and data link layer 340), create and populate routing table 325 with the corresponding entries, aggregate DAO messages from nodes lower in the hierarchy and communicate information contained therein to a node higher in the hierarchy, etc., according to the RPL protocol, as is well known in the relevant arts. In the case of simulation layer 345 changing the RSSI values, RPL adapter layer 330 may be configured to examine the RSSI values in assigning a parent node (which is higher) in the hierarchy. It may be appreciated that the operation of layer 330 would be different in several respects when device 300 corresponds to end devices or border router, as will be apparent to one skilled in the relevant arts by reading the disclosure provided herein.

Network layer 320 delivers to TCP layer 315, the specific data packets having destination IP address equaling self-address of node 300. When operating as a router (i.e., when destination IP address does not equal self-IP address), network layer 320 may retrieve/inspect entries stored in routing table 325 to assist in the routing operations (i.e., determining the next hop information). Network layer 320 instructs data link layer 340 to transmit IP packet to the next hop MAC address determined based on examination of routing table 325.

Transmission Control Protocol (TCP) layer 315 provides a reliable stream of data to applications executing in application layer 310, based on unreliable transport of data packets provided by network layer 320. Similarly, TCP layer 315 operates to receive a sequence of bytes from an application in application layer 310, and uses the services provided by network layer 320 to transmit the sequence, in the form of one or more packets.

Application layer 310 may be viewed as containing various applications which provide any desired functionality to users. It should be appreciated that TCP layer 315 and application layer 310 may not be present in those of the nodes of FIG. 1, which merely operate as routers.

According to an aspect of the present disclosure, simulation layer 340 performs steps 230, 240, 250, 260 and 270 described in FIG. 2. The description is continued with the implementation of position information in wireless devices according to several aspects of the present disclosure.

5. Position Information in Wireless Devices

Figure 4:
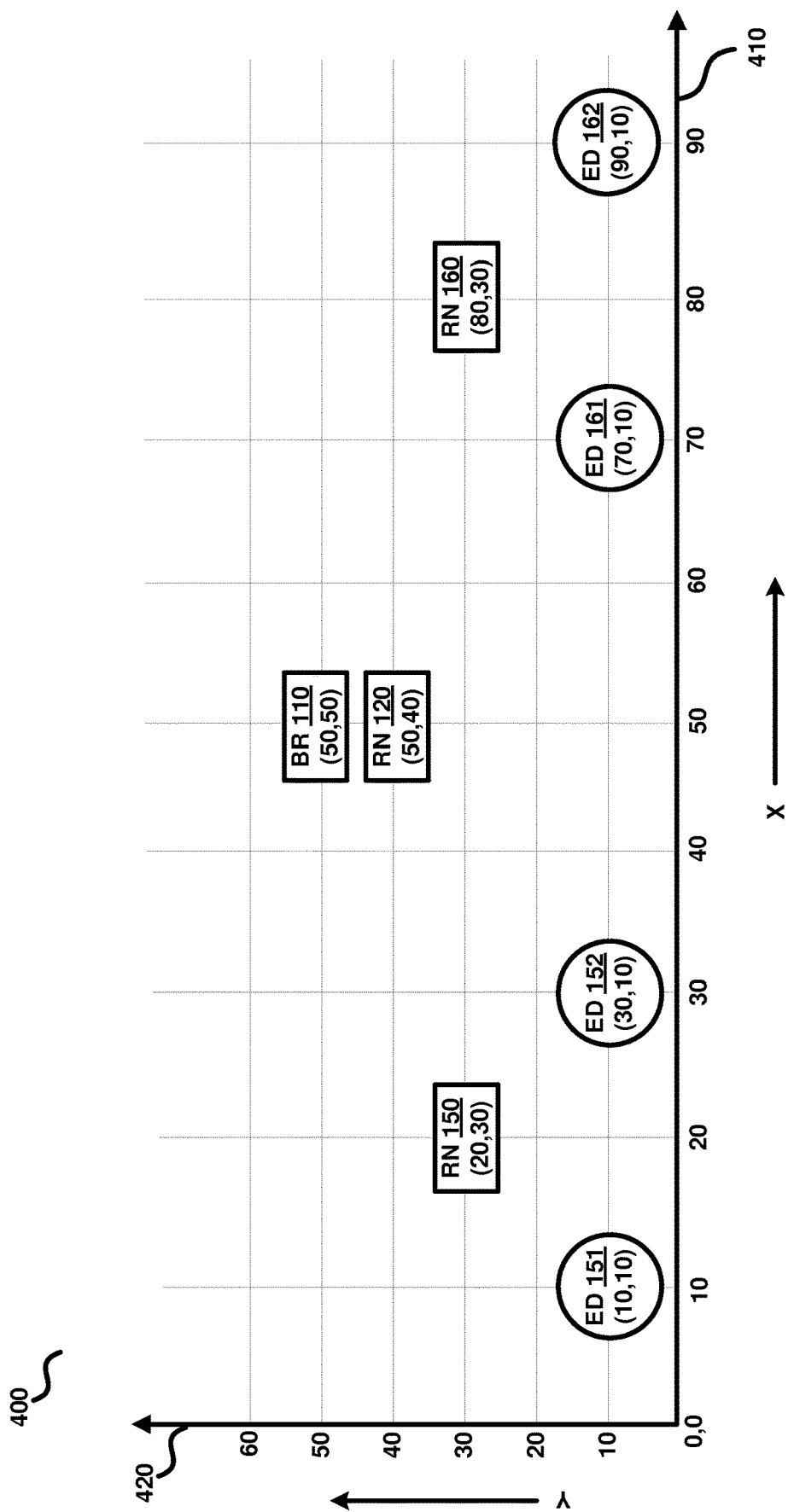
FIG. 4 is a graph illustrating the configuration of positions of various wireless devices of a wireless mesh network, in an embodiment.

FIG. 4 is a graph illustrating the positions of various wireless devices of a wireless mesh network, in an embodiment. As shown, graph 400 has two axes, x-axis 410 and y-axis 420. X-axis 410 is shown with values 0-90 units, and y-axis 420 is shown with values 0-60 units, where the units of measurement of both the axes are assumed to be the same.

As described above, FIG. 1 represents the topology of a mesh network sought to be created from several proximately located wireless devices (e.g., in a test-bed environment). In the real-world, each of the wireless devices represented in FIG. 1's topology are not proximately located, but are spatially separated by certain distances. The object of plotting the wireless devices on the graph 400 is to represent the real-world distances on a graph, and to thereafter enable the creation of the mesh network (e.g., for testing) by maintaining the position information shown in the graph in the corresponding MAC addresses of each of the devices.

Each of the wireless devices shown in the mesh network of FIG. 1 is represented (i.e., plotted) in the graph of FIG. 4. Border router 110 is shown plotted at point BR110 (50,50), with the values of x-coordinate and y-coordinate at 50 units each. The x, y coordinates represent the corresponding Cartesian coordinates for that point. Similarly, other router nodes RN120 (50,40), RN150 (20,30), and RN 160 (80,30), along with end devices ED151 (10,10), ED152 (30,10), ED161 (70,10), ED162 (90,10) are also plotted on graph 400.

The value of the x and y coordinates for each point give the distance of that point from the origin measured along the given axis. Therefore, RN150 (20,30) is 20 units away from the point of origin (represented by 0,0) on the x-axis and 30 units away from the point of origin on the y-axis.

Assuming the real-world distance between RN150 and RN120 is 316 meters. To simulate this real-world distance on the graph, RN150 (20,30) and RN120 (50,40) are spaced apart such that the calculated distance between the two points is equal to a pre-determined factor of the real-world distance. In an example, the real-world distance is greater than the simulated distance by a factor of 10. Therefore, the calculated distance between RN150 and RN120 must be 31.6 units. In an embodiment, the distance between any two points on the graph is calculated using Pythagoras Theorem, applying the formula Distance=sqrt $((X2-X1)^2+(Y2-Y1)^2)$, wherein sqrt represents the square root mathematical operation.

Therefore, the distance between RN150 (20,30) and RN120 (50,40) using the distance formula is calculated as 31.6, such that the real-world distance (316 meters) is greater than the simulated distance (31.6) by a factor of 10. Similarly, other distances between corresponding nodes are plotted on the graph 400.

The x, y coordinates are thereafter represented in the corresponding MAC addresses of the wireless devices. In an embodiment, the x, y coordinates are represented in the last two octets of the device's MAC address. For example, the MAC address of the router node 150 may be set as OD:1D:C9:00:14:1E (wherein 14 and 1E are hexa-decimal representation of 20 and 30 respectively corresponding to RN150), where the first three octets represent the organizationally unique identifier of the organization that owns the router node 150, and the last octets represent the Cartesian coordinates (x, y values) of the router node as plotted on graph 400.

For ease of description, although graph 400 is shown with just one quadrant, the two axes (x and y) divide a plane into four quadrants as is well known in the relevant arts. Therefore, the wireless devices may be plotted in any of the four quadrants, without deviating from the spirit of the present disclosure. Further, although the Cartesian coordinates are shown to be two-dimensional, aspects of the present disclosure equally apply to a 3-dimensional plane. The inclusion of the third-dimension (i.e., a z-axis) enables each point to be represented as an ordered triple (i.e., x, y, z coordinates) in place of the ordered pair (i.e., x and y coordinates) used in the 2-dimensional plane. The X, Y, and Z may then be represented in the last three octets of the device's MAC address.

Thus, when a packet is received, simulation layer 345 extracts the location information from the corresponding octets of the source MAC address, and calculates the distance of the sender node from the location that of node 300. In an embodiment, simulation layer 345 is designed to provide a user interface using which an administrator can configure the MAC address (in particular, at least, the octets representing the position information). The configured position address is stored in a local non-volatile memory and thereafter used for calculating the distance. The administrator may design the location information as depicted in relation to FIG. 4, and thereafter configure each device with corresponding location information.

The implementation details of a router node in an embodiment of the present disclosure are provided next.

6. Example Implementation

Figure 5:
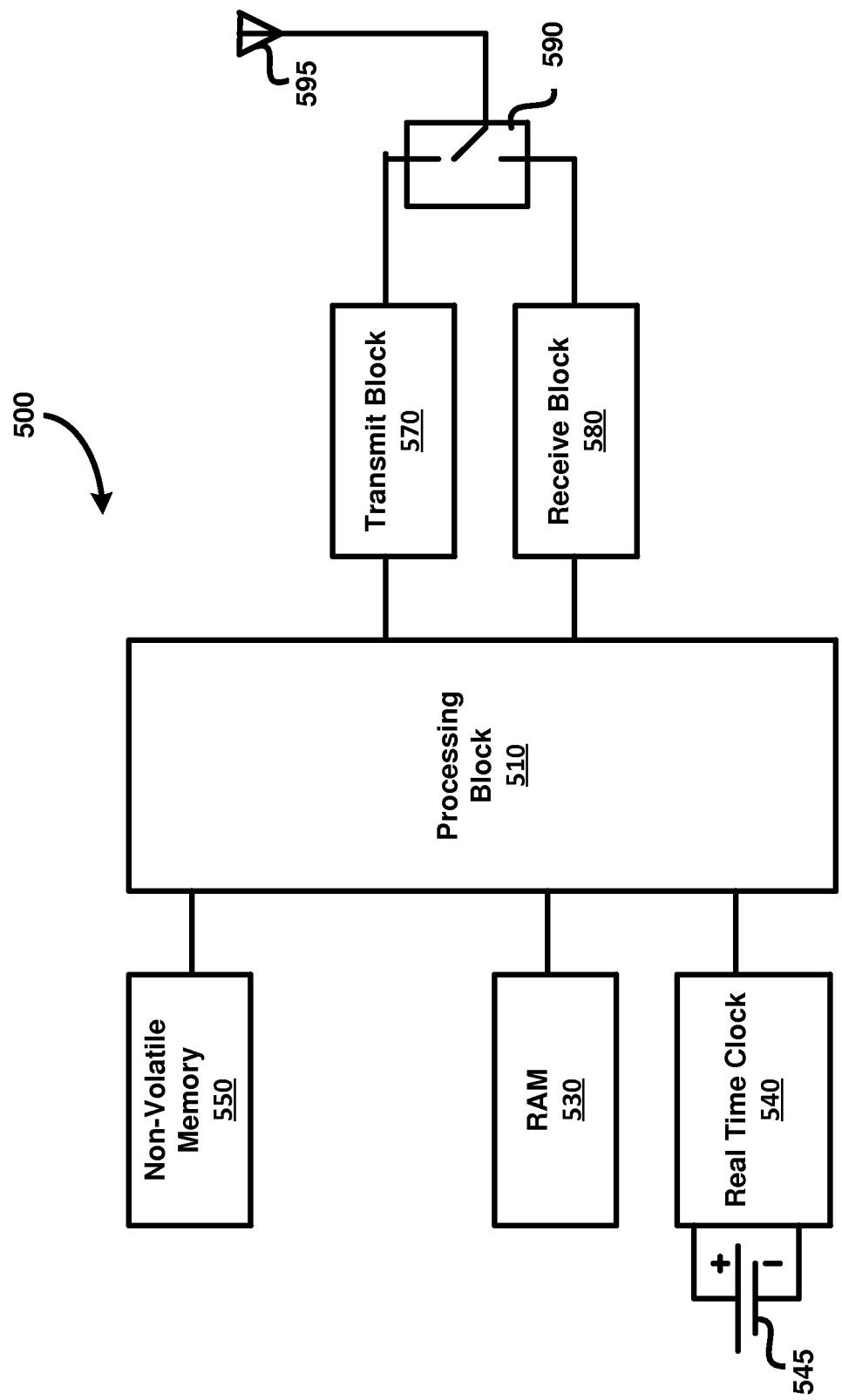
FIG. 5 is a block diagram illustrating the implementation details of a router node in an embodiment of the present disclosure.

FIG. 5 is a block diagram showing the implementation details of a router node in an embodiment of the present disclosure. Wireless device 500 can correspond to any of the routers (110, 120, 150, 160, etc.), end devices (151, 152, 161, 162) and border router 110, of FIG. 1, even though the description is provided assuming device 500 corresponds to router node 150. Device 500 is shown containing processing block 510, random access memory (RAM) 530, real-time clock (RTC) 540, battery 545, non-volatile memory 550, transmit block 570, receive block 580, switch 590, and antenna 595. The whole of wireless device 500 may be implemented as a system-on-chip (SoC), except for battery 545 and antenna 595. Alternatively, the blocks of FIG. 5 may be implemented on separate integrated circuits (IC).

Battery 545 provides power for operation of wireless device 500, and may be connected to the various blocks shown in FIG. 5 (although shown connected only to RTC 540). RTC 540 operates as a clock, and provides the 'current' time to processing block 510.

Antenna 595 operates to receive from, and transmit to, a wireless medium, corresponding wireless signals (e.g., according to IEEE 802.11 (WLAN) standards). It is assumed that the antenna 595 is designed to support both transmission and reception of packets. Specifically, when wireless device 500 operates to send data/packets, antenna 595 operates to transmit to a wireless medium, corresponding wireless signals (e.g., signals directed to other nodes of the mesh network 195). Similarly, when wireless device 500 operates to receive packets, antenna 595 operates to receive from a wireless medium, corresponding wireless signals.

Switch 590 may be controlled by processing block 510 (connection not shown) to connect antenna 595 to one of blocks 570 and 580 as desired, depending on whether transmission or reception of wireless signals is required. Switch 590, antenna 595 and the corresponding connections of FIG. 5 are shown merely by way of illustration. Instead of a single antenna 595, separate antennas, one for transmission and another for reception of wireless signals, can also be used. Various other techniques, well known in the relevant arts, can also be used instead.

Transmit block 570 receives, from processing block 510, data to be transmitted on a wireless signal (e.g., according to a wireless standard such as IEEE 802.11) such as DIS/DIO/DAO messages, generates a modulated radio frequency (RF) signal (according to the standard), and transmits the RF signal via switch 590 and antenna 595. Transmit block 570 may contain RF and baseband circuitry for generating and transmitting wireless signals, as well as for medium access operations. Alternatively, transmit block 570 may contain only the RF circuitry, with processing block 510 performing the baseband and medium access operations (in conjunction with the RF circuitry).

Receive block 580 represents a receiver that receives a wireless (RF) signal (e.g., representing DIS/DIO/DAO messages), bearing data and/or control information (e.g., the position information of the sender node) via switch 590, and antenna 595, demodulates the RF signal, and provides the extracted data or control information to processing block 510. Receive block 580 may contain RF as well as baseband processing circuitry for processing a WLAN signal. Alternatively, receive block 580 may contain only the RF circuitry, with processing block 510 performing the baseband operations in conjunction with the RF circuitry.

When wireless device 500 is implemented according to IEEE 802.15.4 standards, transmit block 570, receive block 580, antenna 595 and the corresponding signals would be according IEEE 802.15.4.

Non-volatile memory 550 is a non-transitory machine readable medium, and stores instructions (e.g., instructions to operate as simulation layer 345), which when executed by processing block 510, causes wireless device 500 to operate as described above. In particular, the instructions enable wireless device 500 to operate as described with respect to the flowchart of FIG. 2. Non-volatile memory 550 may also be configured to store position information of wireless device 500.

RAM 530 is a volatile random access memory, and may be used for storing instructions and data. RAM 530 and non-volatile memory 550 (which may be implemented in the form of read-only memory/ROM/Flash) constitute computer program products or machine (or computer) readable medium, which are means for providing instructions to processing block 510. Processing block 510 may retrieve the instructions, and execute the instructions to provide several features of the present disclosure described above.

Processing block 510 (or processor in general) may contain multiple processing units internally, with each processing unit potentially being designed for a specific task. Alternatively, processing block 510 may contain only a single general-purpose processing unit. Processing block 510 may execute instructions stored in non-volatile memory 550 or RAM 530 to enable wireless device 500 to operate according to several aspects of the present disclosure, described above in detail.

In particular, processing block 510 implements the various layers depicted in FIG. 3, including the various steps of FIG. 2. In addition, processing block 510 may provide the user interfaces for configuration of location information, noted above. The location information may be stored in non-volatile memory 550, as noted above.

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a wireless device, said method comprising:
   receiving a packet from a sender node that is in a real-world environment according to a routing protocol, wherein said wireless device is one node in a plurality of nodes, the plurality of nodes are all within a communication range of each other, the plurality of nodes communicate in a manner that treats messages according to a routing protocol of a a test environment, wherein said sender node is located at a distance within a wireless transmission range of said wireless device, and wherein said real-world environment includes all nodes that are within a wireless transmission range of said wireless device and wherein said real-world;
   determining a position information of said sender node;
   calculating a distance to said sender node from said wireless device, wherein said distance is in X, Y, Z coordinates; and
   if said distance to said sender node from said wireless device is within said communication range of said wireless device, then processing said packet according to said routing protocol in said test environment, else discarding said packet;
   wherein said position information of said sender node and said distance are part of a medium access control (MAC) address of said sender node, wherein said MAC address is part of said packet received from said sender node, said determining comprises: examining said MAC address in said packet for said position information of said sender node.

2. The method of claim 1, further comprising: maintaining, in said wireless device, a position information for said wireless device, wherein said distance is calculated based on said position information of said sender node and said position information of said wireless device.

3. The method of claim 2, wherein said maintaining comprises: receiving said position information of said wireless device from a user; and storing said position information in a memory contained in said wireless device, wherein said examining retrieves said position information from memory and said calculating is performed using the retrieved position information.

4. The method of claim 3, wherein said position information is in the form of Cartesian coordinates, and said distance is the spatial distance between Cartesian coordinates of said sender node and that of said wireless device.

5. The method of claim 1, further comprising:
   generating, in said wireless device, a value representing a signal strength with which said packet is received; and
   modifying said value for said packet based on said distance to said sender node and providing said modified value to a routing adapter layer, wherein said routing adapter layer is designed to choose a parent node from a plurality of parent nodes based on signal strengths of packets received from each of the parent node, wherein providing said modified value causes said routing adapter layer to select one of said plurality of parent nodes as said parent node based on said modified value.

6. The method of claim 1, further comprising:
   overwriting at least one bit in said packet by a simulation layer, thereby generating an error packet;
   forwarding said error packet to a higher layer in said wireless device for further processing; and
   generating an error by said higher layer while processing said error packet.

7. A non-transitory machine readable medium storing one or more sequences of instructions for enabling a wireless device to process packets, wherein execution of said one or more instructions by one or more processors contained in said wireless device said wireless device to perform the actions of:
   receiving a packet from a sender node that is in a real-world environment according to a routing protocol, wherein said wireless device is one node in a plurality of nodes, the plurality of nodes are all within a communication range of each other, the plurality of nodes communicate in a manner that treats messages according to a routing protocol of a a test environment, wherein said sender node is located at a distance within a wireless transmission range of said wireless device, and wherein said real-world environment includes all nodes that are within a wireless transmission range of said wireless device and wherein said real-world;
   determining a position information of said sender node;

calculating a distance to said sender node from said wireless device, wherein said distance is in X, Y, Z coordinates; and if said distance to said sender node from said wireless device is within said communication range of said wireless device, then processing said packet according to said routing protocol in said test environment, else discarding said packet;

wherein said position information of said sender node and said distance are part of a medium access control (MAC) address of said sender node, wherein said MAC address is part of said packet received from said sender node, said determining comprises: examining said MAC address in said packet for said position information of said sender node.

8. The non-transitory machine readable medium of claim 7, further comprising instructions to cause said wireless device to perform the actions of: maintaining, in said wireless device, a position information for said wireless device, wherein said distance is calculated based on said position information of said sender node and said position information of said wireless device.

9. The non-transitory machine readable medium of claim 8, wherein said maintaining comprises: receiving said position information of said wireless device from a user; and storing said position information in a memory contained in said wireless device, wherein said examining retrieves said position information from memory and said calculating is performed using the retrieved position information.

10. The non-transitory machine readable medium of claim 9, wherein said position information is in the form of Cartesian coordinates, and said distance is the spatial distance between Cartesian coordinates of said sender node and that of said wireless device.

11. The non-transitory machine readable medium of claim 7, further comprising instructions to cause said wireless device to perform the actions of:

generating, in said wireless device, a value representing a signal strength with which said packet is received; and modifying said value for said packet based on said distance to said sender node and providing said modified value to a routing adapter layer, wherein said routing adapter layer is designed to choose a parent node from a plurality of parent nodes based on signal strengths of packets received from each of the parent node, wherein providing said modified value causes said routing adapter layer to select one of said plurality of parent nodes as said parent node based on said modified value.

12. The non-transitory machine readable medium of claim 7, further comprising instructions to cause said wireless device to perform the actions of:

overwriting at least one bit in said packet by a simulation layer, thereby generating an error packet;

forwarding said error packet to a higher layer in said wireless device for further processing; and generating an error by said higher layer while processing said error packet.

13. A wireless device comprising: a processor and a memory, said memory to store instructions which when retrieved and executed by said processor causes said wireless device to perform the actions of:

receiving a packet from a sender node that is in a real-world environment according to a routing protocol, wherein said wireless device is one node in a plurality of nodes, the plurality of nodes are all within a communication range of each other, the plurality of nodes communicate in a manner that treats messages according to a routing protocol of a a test environment, wherein said sender node is located at a distance within a wireless transmission range of said wireless device, and wherein said real-world environment includes all nodes that are within a wireless transmission range of said wireless device and wherein said real-world;

determining a position information of said sender node;

calculating a distance to said sender node from said wireless device, wherein said distance is in X, Y, Z coordinates; and if said distance to said sender node from said wireless device is within said communication range of said wireless device, then processing said packet according to said routing protocol in said test environment, else discarding said packet;

wherein said position information of said sender node and said distance are part of a medium access control (MAC) address of said sender node, wherein said MAC address is part of said packet received from said sender node, said determining comprises: examining said MAC address in said packet for said position information of said sender node.

14. The wireless device of claim 13, wherein said processor further performs the action of: maintaining, in said wireless device, a position information for said wireless device, wherein said distance is calculated based on said position information of said sender node and said position information of said wireless device.

15. The wireless device of claim 14, wherein said maintaining comprises:

receiving said position information of said wireless device from a user; and storing said position information in a memory contained in said wireless device, wherein said examining comprises retrieving said position information from memory and said calculating is performed using the retrieved position information, wherein said position information is in the form of Cartesian coordinates, and said distance is the spatial distance between Cartesian coordinates of said sender node and that of said wireless device.

16. The wireless device of claim 13, wherein said processor further performs the action of:

generating, in said wireless device, a value representing a signal strength with which said packet is received; and modifying said value for said packet based on said distance to said sender node and providing said modified value to a routing adapter layer, wherein said routing adapter layer is designed to choose a parent node from a plurality of parent nodes based on signal strengths of packets received from each of the parent node, wherein providing said modified value causes said routing adapter layer to select one of said plurality of parent nodes as said parent node based on said modified value.

17. The wireless device of claim 13, wherein said processor further performs the action of:

overwriting at least one bit in said packet by a simulation layer, thereby generating an error packet;

forwarding said error packet to a higher layer in said wireless device for further processing; and generating an error by said higher layer while processing said error packet.

* * * * *